April 13, 1926.
Re. 16,324
O. G. SCHMITT
CLOTHESRACK
Original Filed April 14, 1922
FIG. 1
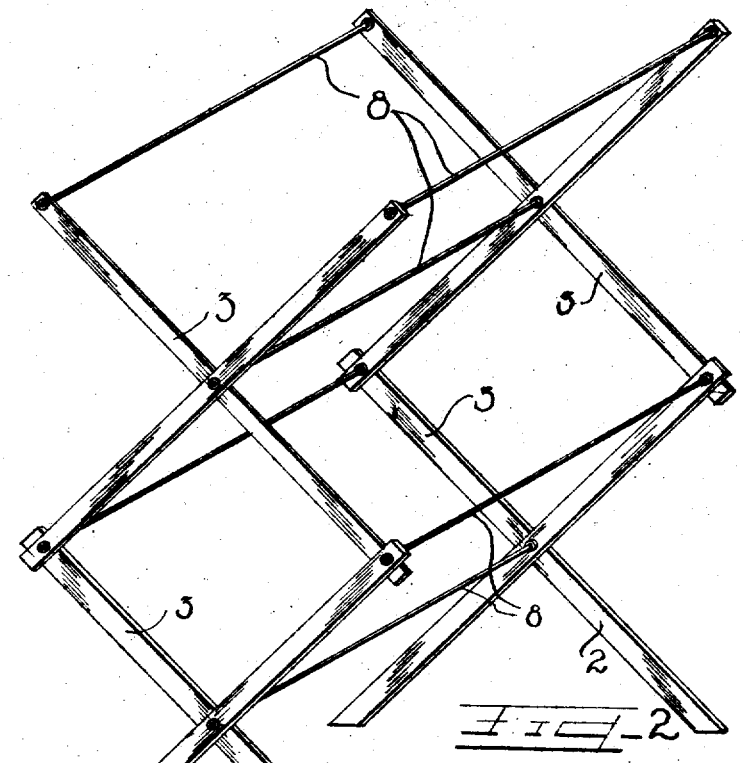
FIG. 2
FIG. 3
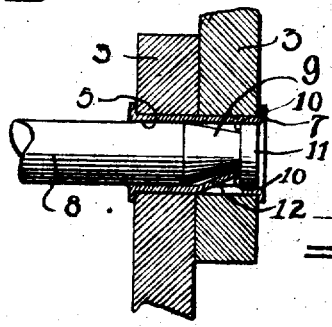
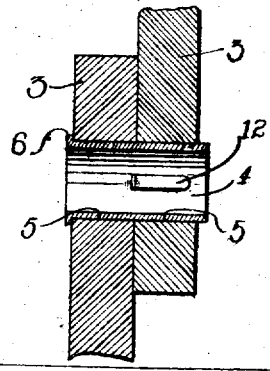
INVENTOR
O. G. Schmitt
BY Charles W. Hills
ATTY Reissued Apr. 13, 1926.

Re. 16,324

UNITED STATES PATENT OFFICE.

OTTO G. SCHMITT, OF CHICAGO, ILLINOIS.

CLOTHESRACK.

Original No. 1,533,470, dated April 14, 1925, Serial No. 552,465, filed April 14, 1922. Application for reissue filed November 27, 1925. Serial No. 71,786.

*To all whom it may concern:*

Be it known that I, OTTO G. SCHMITT, a citizen of the United States, and a resident of Chicago, in the county of Cook and State of Illinois, have invented a new and useful Improvement in Clothesracks, of which the following is a full, clear, and exact description.

My invention relates to improvements in clothes racks, and it consists in the combinations, constructions, and arrangements herein described and claimed.

An object of my invention is to provide an improvement over that form of the device shown in my prior application for patent on clothes rack, Serial No. 526,685, filed January 3, 1922. In said prior application, I disclosed a clothes rack in which all of the members can be disassembled one from the other and be packed in a small space for shipment. The construction of the present device is primarily designed to obviate the disadvantage of having to assemble all of the members of the rack. To this end, I permanently secure the members of the telescopic or lazy-tong supporting frames to each other. These supports, when in collapsed position, may be packed in as small a space as when they are entirely disassembled.

A further object of my invention is to provide a device of the character described in which the locking means permits the assembly of the rack in only the right way.

A further object of my invention is to provide a device of the character described which is very simple in construction, consists of the minimum number of parts when disassembled, and which can be assembled by anyone.

Other objects and advantages will appear in the following specification, and the novel features of the invention will be particularly pointed out in the appended claims.

My invention is illustrated in the accompanying drawings, forming part of this application, in which—

Figure 1 is a perspective view of the assembled clothes rack,

Figure 2 is a sectional view of one of the joints partially assembled, and

Figure 3 is a sectional view of an assembled joint.

A relatively large expense is incurred in the shipment of the ordinary collapsible clothes rack. This is due to the fact that the rack is more or less bulky when in collapsed position and must be crated before it can be shipped. The crating of each rack obviously is expensive. Furthermore, the rack when crated has to be shipped by express. I have found that by disassembling the rack the rack can be packed into a very small space and furthermore, does not have to be crated. The rack when packed in this small space can be shipped by parcel post instead of by express, thereby saving a great deal in the shipping cost.

In carrying out my invention, I provide two lazy-tong supports or frames 1 and 2 which comprise a plurality of sticks or slats 3 pivoted together at their ends and midpoints. The slats or bars 3 are pivotally secured to each other by sleeves 4 which are disposed in alined openings 5 of the bars 3. In Figure 2, I have shown the sleeve 4 disposed in the openings 5. It will be noted that the sleeve 4 is provided with an outwardly extending flange 6. The opposite end of the sleeve 4 is then upset so as to provide a flange 7 (see Figure 3). In this manner, the bars 3 are permanently secured to each other.

The lazy-tongs supports 1 and 2 are secured to each other by transversely extending rods 8. The ends of the rods 8 are provided with annular grooves 9. It will be noted that the groove 9 tapers inwardly from the surface of the rod 8 and has a shoulder 10 which forms a head 11 to the rod. The rods 8 have a groove 9, a shoulder 10, and a head 11 at each end thereof.

The sleeves 4 have a locking means which permanently locks the rods 8 in place when they are assembled therein. Furthermore, the locking means permits the rods 8 to enter the sleeves 4 from only one side. This construction provides a rack which can only be assembled in the right way. The locking means constitutes a prong 12 which is struck up from the inner wall of the sleeve 4 (see Figure 2). The end of the spring stop or prong 12 bears against the shoulder 11 when the rod 8 is disposed within the sleeve 4. The spring 12 prevents the removal of the rod 8 from the sleeve 4 when the rod is once assembled therein. The spring stop 12, however, does not prevent the rod 8 from being rotated within the sleeve 4, or prevent the bars 3 from swinging about the sleeve 4.

In other words, when the bars 8 are assembled in the sleeves 4, the rack resembles the ordinary clothes rack in every detail, and like the ordinary clothes rack, it cannot be disassembled. Furthermore the spring stop 12 prevents the rod 8 from entering the opposite end of the sleeve 4 than that shown in Figure 3, since the end of the stop 12 engages with the head 11 and prevents any further movement of the rod 8 into the sleeve 4. The rack is therefore practically fool proof and can readily be assembled by anyone.

From the foregoing description of the various parts of the device, the operation thereof may be readily understood. As heretofore stated, the lazy-tong supports 1 and 2 cannot be disassembled. The rack is not assembled until after it reaches its destination. In shipping, the lazy-tong supports 1 and 2 are folded into a small space, and the rods 8 are disposed therewith. The device does not have to be crated and also does not have to be shipped by express. The device can be readily assembled and provides a permanent structure when once assembled, i. e., cannot again be disassembled.

In Figure 1, the top rods 8 do not extend through two of the bars 3. In this case, the sleeves 4 are of half length as the other sleeves. These smaller sleeves are provided with spring stops 12 which effectually lock the rods 8 in place when assembled.

The device is very simple in construction, and can be readily assembled by anyone. It can be packed into a small space for shipment and does not have to be crated. It will therefore be apparent that the shipping costs are reduced to a minimum.

The sleeves 4 frictionally engage with the bars 3 and prevent the bars from rotating about the sleeves, except when manually moved. The feet of the device also frictionally engage with the floor or other supporting surface, and are prevented from outward movement with respect to each other. These two features prevent the collapse of the device when the device is being used.

I claim as my invention:

1. A collapsible clothes rack comprising a plurality of bars, sleeves for pivotally securing said bars together, rods having their ends mounted in said sleeves, and means for permanently locking said rods in said sleeves.

2. In a collapsible clothes rack, a pair of bars, a sleeve for pivotally securing said bars together a rod carried by said sleeve, and means for locking said rod in said sleeve, said means permitting said rod to be inserted into said sleeve from only one end.

3. In a collapsible clothes rack a plurality of bars, metallic sleeves pivotally but inseparably securing said bars together, and a clothes supporting rod having its ends supported in said sleeves.

4. In a collapsible clothes rack a plurality of bars affording end supports, hollow sleeves engaged through said bars to afford pivotal connections therebetween, and a rod extending between said end supports and rotatably secured in said sleeves.

5. A clothes rack including two relatively movable pivoted members and a member having a tenon on one end; a sleeve upon which said movable members are pivoted and inseparably connected, and means within said sleeve to hold said tenon therein and permit its rotation.

In testimony whereof I have hereunto subscribed my name.

OTTO G. SCHMITT.